United States Patent [19]

Ryoke et al.

[11] Patent Number: 4,731,278

[45] Date of Patent: Mar. 15, 1988

[54] MAGNETIC RECORDING MEDIUM

[75] Inventors: Katsumi Ryoke; Masatoshi Takahashi; Eiichi Tadokoro, all of Kanagawa, Japan

[73] Assignee: Fuji Photo Film Co., Ltd., Kanagawa, Japan

[21] Appl. No.: 862,724

[22] Filed: May 13, 1986

[30] Foreign Application Priority Data

May 13, 1985 [JP] Japan ................... 60-101078

[51] Int. Cl.$^4$ ................... G11B 5/706; G11B 5/708
[52] U.S. Cl. ................... 428/141; 427/131; 428/323; 428/329; 428/694; 428/900
[58] Field of Search ............ 428/323, 141, 329, 694, 428/900; 427/131

[56] References Cited

U.S. PATENT DOCUMENTS

| | | | |
|---|---|---|---|
| 3,953,656 | 4/1976 | Tokuoka et al. | 428/694 |
| 4,455,345 | 6/1984 | Miyatuka et al. | 428/695 |
| 4,465,735 | 8/1984 | Togawa et al. | 428/694 |
| 4,503,120 | 3/1985 | Yamauchi et al. | 428/900 |
| 4,539,257 | 9/1985 | Ryoke et al. | 427/131 |
| 4,551,386 | 11/1985 | Yamaguchi et al. | 427/131 |
| 4,598,014 | 7/1986 | Miyoshi et al. | 427/131 |

*Primary Examiner*—Paul J. Thibodeau
*Attorney, Agent, or Firm*—Sughrue, Mion, Zinn, Macpeak & Seas

[57] ABSTRACT

A magnetic recording medium is described, comprising a magnetic layer containing ferromagnetic fine particles and a binder coated on one side of a non-magnetic support and a backing layer coated on the opposite side of the non-magnetic support, wherein said ferromagnetic fine particles have a cobalt content of from 2 to 10 wt % with respect to the iron oxide content thereof, the content of divalent iron ($Fe^{2+}$) of from 1 to 10 wt % with respect to the trivalent iron ($Fe^{3+}$) content thereof, and the specific surface area of from 30 to 50 m$^2$/g, said binder comprises a copolymer of vinyl chloride-vinyl acetate-maleic acid contained in an amount of 40 wt % or more with respect to the total binder content of the magnetic layer, an abrasive agent having a Mohs hardness of 6 or more is contained in said magnetic layer, and the resulting magnetic tape has a coercive force of from 750 to 900 Oe at 25° C.

6 Claims, No Drawings

MAGNETIC RECORDING MEDIUM

FIELD OF THE INVENTION

The present invention relates to a magnetic recording medium, and more particularly it relates to a magnetic recording medium having an excellent modulation noise characteristic and having a reduced rate of errors caused by dropouts.

BACKGROUND OF THE INVENTION

Recently, digital magnetic recording has been keenly studied, and system design and tape design therefor have been developed and become common. A characteristic feature of digital magnetic recording is that a higher image quality and a higher tone quality can be expected than those obtainable by conventional analog recording. Items to be selected in a system design include a recording method, a detection method, and an equalization. On the other hand, for tape design, it is important to determine how best to realize high density recording and to analyze the means to attain high density recording. The present invention relates to tape design and to a magnetic recording medium for attaining high density recording.

Different from a magnetic recording medium for analog recording, in a magnetic recording medium for digital recording, recording is made by binary system using 0 and 1. Thus, even though noises are interjected, the initial digital information can be firmly maintained. Therefore, digital recording is very effective against noise. However, as digital recording is made by binary system, errors easily occur upon recording and replaying. These errors in a magnetic recording medium are attributed to dropouts caused by tiny dust particles and contaminants adhered thereon, cross talk from an adjacent track, a prior recorded signal because of insufficient erasure, and printed-through signals. These errors are serious defects and impair the quality of the magnetic recording medium and should be completely avoided. Further, in a magnetic recording medium, tape running noise and head impedance noise and the like needs to be controlled. S/N (signal/noise) of replayed signals depends on bit distance, width of a recording track, coercive force of a tape, squareness ratio, and the like, and these depend on various system designs.

SUMMARY OF THE INVENTION

A first object of the present invention is to provide a novel magnetic layer, thereby providing a magnetic recording medium having a reduced error rate.

A second object of the present invention is to provide a magnetic recording medium having improved modulation noise of a magnetic layer.

A third object of the present invention is to provide a magnetic recording medium having an excellent C/N.

A fourth object of the present invention is to provide a magnetic recording medium having reduced output decrease and reduced dropouts.

The inventors of the present invention have conducted extensive research into magnetic recording media for digital magnetic recording in light of the above-described background, and as a result they have found that when certain properties, such as the cobalt content in the ferromagnetic particles contained in a magnetic layer, the content of divalent iron, the specific surface area of the ferromagnetic particles, the kind(s) of binder and abrasive agent, the coercive force of the resulting magnetic tape, and the surface roughness of a backing layer bear a prescribed relationship therebetween, then the noise, decrease of output, and extent of dropouts are largely improved.

Thus, in a magnetic recording medium comprising a magnetic layer containing ferromagnetic iron oxide particles and a binder coated on one side of a non-magnetic support and a backing layer coated on the opposite side of the non-magnetic support, the present invention is characterized by the following features. That is, in the ferromagnetic iron oxide particles, the cobalt content is from 2 to 10 wt % with respect to the iron oxide content thereof, the content of divalent iron ($Fe^{2+}$) is from 1 to 10 wt % with respect to the trivalent iron ($Fe^{3+}$) content therof, and the specific surface area (measured by the nitrogen absorption method ($S_{BET}$)) is from 30 to 50 $m^2/g$. Further, the binder contains 40 wt % or more of a vinyl chloride-vinyl acetate-maleic anhydride copolymer. Furthermore an abrasive agent having a Mohs hardness of 6 or more is contained in the magnetic layer, and the resulting magnetic tape has a coercive force of from 750 to 900 Oe at 25° C. Still further, the backing layer has a center line average roughness (Ra) of 0.014 $\mu$m or less at a cutoff value of 0.8 mm.

DETAILED DESCRIPTION OF THE INVENTION

It has been found desirable in the present invention, as characteristic of ferromagnetic fine particles, that the unit magnetization axis is shortened and the specific surface area measured by the nitrogen absorption method is adjusted to from 30 to 50 $m^2/g$, in order to realize high density recording. The coercive force of the magnetic tape is adjusted to from 750 to 900 Oe in order to expand the recording band. When the specific surface area is lower than 30 $m^2/g$, any one of C/N, C/N with the passage of time, output, and dropouts becomes deteriorated. When coercive force of magnetic tape is lower than 750 Oe, C/N and dropouts are extremely adversely affected. Further, erasure characteristic and print through characteristic are controlled by the content of divalent iron ($Fe^{2+}$) of the ferromagnetic fine particles, which is from 1 to 10 wt % per trivalent iron ($Fe^{3+}$), and the content of cobalt is from 2 to 10 wt % per iron oxide in order to control coercive force and saturation magnetic flux density. It is desired that divalent iron be used in amount of from 1 to 10 wt % in order to prevent occurrence of errors caused by deterioration of print through and erasure. The cobalt content may be adjusted to control coercive force and the like, and the above-described cobalt content is effective for electromagnetic properties of a magnetic recording medium. However, with this content, ferromagnetic fine particles tend to be too soft, and dropouts caused by wear of a magnetic recording medium itself cannot be prevented. In view of the above and in order to prevent noise caused by the head, it is required that abrasive agents having a Mohs hardness of 6 or more are employed. Further, a large amount of a binder is necessary to disperse these abrasive agents. When binders with low dispersibility are used, aggregates of undispersed binders easily generate, which would be a very significant cause of errors. The above disadvantage can be removed by using a vinyl chloride-vinyl acetate-maleic anhydride copolymer, particularly preferably in combination with a polyurethane resin. The bit distance depends upon the above-described system, and should generally be from 0.1 to 2.0 $\mu$m in order to realize high density recording. Therefore, the center line average roughness of a magnetic layer is desirably 0.020 μm or lower. As a result of measuring the center line average roughness of a magnetic layer varying the cutoff value, an unevenness of 50 μm or more on the surface of the magnetic layer should be avoided. The surface roughness of the magnetic layer has a close relationship to the surface roughness of the backing layer, and Ra of the backing layer is preferably 0.014 μm or lower at a cutoff value of 0.8 mm so that C/N should not be decreased.

Ferromagnetic fine particles used in the present invention include Co-containing $\gamma$-$Fe_2O_3$, wherein divalent iron ($Fe^{2+}$) is contained in an amount of from 1 to 10 wt % with respect to the trivalent iron ($Fe^{3+}$) content, and cobalt (Co) is contained in an amount of from 2 to 10 wt % per iron oxide.

Preferably, the content of $Fe^{2+}$ is from 1 to 8 wt % with respect to the $Fe^{3+}$ and the Co content is from 3 to 8 wt % with respect to the iron oxide content, and more preferably the content of $Fe_{2+}$ is from 1 to 5 wt % with respect to the $Fe_{3+}$ and the Co content is from 4 to 6 wt % with respect to the iron oxide content.

The particle size of the ferromagnetic fine particles is generally from about 0.01 to 1 μm, and the acicular ratio (axis length/axis width) is generally from about 1/1 to 50/1. The specific surface area of these ferromagnetic fine particles is about from 30 $m^2$/g to 50 $m^2$/g measured by nitrogen absorption method, a so-called B.E.T. method, as described in S. Brunauer, P. H. Emmett, and Teller, *J. Am. Chem. Soc.*, 60, 309 (1938), ibid. 57, 1754 (1935), and ibid. 59, 310, 1533, 2682 (1937). Dispersing agents, lubricating agents, antistatic agents, and the like contained in a solvent can be impregnated and adsorbed onto the surface of ferromagnetic fine particles prior to dispersion, depending on the particular purpose. The coercive force of the magnetic recording medium is from 750 to 900 Oe, preferably from 800 to 880 Oe, at 25° C.

It is desirable that an apparent density of the ferromagnetic fine particles used in the present invention is 0.50 g/cc or more for balancing particularly the characteristics such as dispersibility and the like and abrasive properties of a tape itself.

Binders used in the present invention are required to include a terpolymer of vinyl chloride, vinyl acetate, and maleic anhydride. The contents of vinyl chloride, vinyl acetate, and maleic anhydride in the terpolymer are generally from 80 to 95 wt %, from 5 to 15 wt %, and 1 to 10 wt %, respectively. Such binders are used in an amount of 40 wt % or more, preferably from 40 to 60 wt %, with respect to the total binder content of the magnetic layer.

Binders that can be used in combination with the above-described binders include conventionally known thermoplastic resins, thermosetting resins, reactive type resins, and mixtures thereof.

Thermoplastic resins used in the present invention are preferably thermoplastic resins having a softening point of 150° C. or less, an average molecular weight of from 10,000 to 300,000, and a degree of polymerization of from about 50 to 1,000. Examples include a copolymer of vinyl chloride and vinyl acetate, a copolymer of vinyl chloride and vinylidene chloride, a copolymer of vinyl chloride and acrylonitrile, a copolymer of acrylic acid ester and acrylonitrile, a copolymer of acrylic acid ester and vinylidene chloride, a copolymer of acrylic acid ester and styrene, a copolymer of methacrylic acid ester and acrylonitrile, a copolymer of methacrylic acid ester and vinylidene chloride, a copolymer of methacrylic acid ester and styrene, an urethane elastomer, a nylon-silicone type resin, a nitrocellulose-polyamide resin, polyvinyl fluroide, a copolymer of vinylidene chloride and acrylonitrile, a copolymer of butadiene and acrylonitrile, a polyamide resin, polyvinyl butyral, cellulose derivatives (e.g., cellulose acetate butyrate, cellulose diacetate, cellulose triacetate, cellulose propionate, nitrocellulose, and the like), a copolymer of styrene and butadiene, a polyester resin, a copolymer of chlorovinyl ether and acrylic acid ester, an amino resin, various synthetic rubber type thermoplastic resins, and mixtures thereof.

Specific examples of such resins are disclosed in Japanese Patent Publication Nos. 6877/62, 12528/64, 19282/64, 5349/65, 20907/65. 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72, and 27886/72.

The molecular weight of thermosetting resins or reactive type resins is 200,000 or lower at the state of being contained in a coating composition and it becomes essentially infinite due to condensation and addition reaction when a coating composition is coated, dried, and heated. Of those resins, resins that do not soften or melt prior to heat-decomposition are preferred. Examples of such resins include a phenol resin, an epoxy resin, a polyurethane curing type resin, a urea resin, a melamine resin, an alkyd resin, a silicone resin, an acrylic type reactive resin, an epoxy-polyamide resin, a nitro-cellulose-melamine resin, a mixture of high molecular weight polyester resin and an isocyanate prepolymer, a mixture of methacrylate copolymer and diisocyanate prepolymer, a mixture of polyester polyol and polyisocyanate, a urea-formaldehyde resin, a mixture of a low molecular weight glycol/high molecular weight diol/triphenylmethane triisocyanate, and a polyamine resin, and mixtures thereof.

Specific examples of these resins are disclosed in Japanese Patent Publication Nos. 8103/64, 9779/65, 7192/66, 8016/66, 14275/66, 18179/67, 12081/68, 28023/69, 14501/70, 24902/70, 13103/71, 22065/72, 22066/72, 22067/72, 22072/72, 22073/72, 28045/72, 28048/72, and 28922/72.

Binders which may be used in combination as a copolymer of vinyl chloride, vinyl acetata, and maleic anhydride are preferably a polyurethane resin or an epoxy resin, and a polyurethane resin is particularly preferred.

Polyisocyanates used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, or triphenylmethane triisocyanate; a reaction product of the isocyanates and polyalcohol; and polyisocyanates produced by the condensation reaction of isocyanates. These polyisocyanates are commercially available, under trademarks "Collonate L", "Collonate HL", "Collonate 2030", "Collonate 2031", "Millionate MR", and "Millionate MTL", manufactured by Nippon Polyurethane Co., Ltd.; "Takenate D-102", "Takenate D-11ON", "Takenate D-200", and "Takenate D-202", manufactured by Takeda Chemical Industries, Ltd.; "Desmodur L", "Desmodur IL", "Desmodur N", and "Desmodur HL", manufactured by Sumitomo Bayer Co., Ltd. These polyisocyantes can be used alone or in combination using the difference of curing reaction of two or more thereof.

These binders can be used alone or in combination and additives can be added thereto. The mixing ratio of binder (i.e., total binder) to ferromagnetic fine particles is from 5 to 300 parts by weight per 100 parts by weight of ferromagnetic fine particles.

The additives include abrasive agents, dispersing agents, lubricating agents, antistatic agents, and the like.

The abrasive agents used in the present invention are those that have Mohs hardness of 6 or more, preferably 8 or more, have polishing and abrasive functions and are generally known and used, such as aluminum oxide (e.g., α-, δ-, γ-, or θ-alumina, a mixture thereof, and fused alumina), silicon carbide, chromium oxide, cerium oxide, corundum, artificial diamond, α-iron oxide, garnet, emery (mainly composed of corundum and magnetite), silica, silicon nitride, boron nitride, molybdenum carbide, boron carbide, tungsten carbide, and titanium carbide. An average particle size of these abrasive agents is preferably from 0.01 to 5 μm, and more preferably from 0.05 to 5 μm. Those abrasive agents are preferably used in an amount of from 0.01 to 20 parts by weight per 100 parts by weight of the total binder. Specific examples of such abrasive agents are disclosed in Japanese Patent Application (OPI) No. 115510/74, U.S. Pat. Nos. 3,687,725, 3,007,807, 3,041,196, 3,293,066, and 3,630,910, British Patent No. 1,145,349, and West German Patent No. 853,211.

The dispersing agents that can be used in the present invention include a fatty acid having from 10 to 22 carbon atoms ($R_1COOH$, wherein $R_1$ is an alkyl group having from 9 to 21 carbon atoms) such as caprylic acid, capric acid, lauric acid, myristic acid, palmitic acid, stearic acid, oleic acid, elaidic acid, linoleic acid, linolic acid, or stearol acid; an alkali metal (Li, Na, K, etc.) and an alkaline earth metal (Mg, Ca, Ba, etc.) of the above fatty acid; a metal soap comprised of Cu, Pb and the like; lecithin; etc. A higher alcohols having 10 or more of carbon atoms and a sulfuric ester and phosphoric ester thereof can be also used. These dispersing agents can be used in an amount of from 0.05 to 20 parts by weight per 100 parts by weight of the total binder. These dispersing agents can be coated on ferromagnetic fine particles and non-magnetic fine particles beforehand, or can be added during the dispersion process. Such dispersing agents are disclosed in Japanese Patent Publication Nos. 28369/64, 17945/69, and 15001/73 and U.S. Pat. Nos. 3,387,993 and 3,470,021.

The lubricating agents used in the present invention include silicone oil, graphite, molybdenum disulfide, boron nitride, fluorinated graphite, fluorinated alcohol, polyolefin (e.g., polyethylene wax and the like), polyglycol (polyethylene oxide wax and the like), alkyl phosphate, polyphenyl ether, tungsten disulfide; fatty acid esters comprised of a monobasic fatty acid having from 10 to 20 carbon atoms and at least one or more of compounds having from 3 to 12 carbon atoms selected from monohydric alcohol, dihydric alcohol, trihydric alcohol, quatrehydric alcohol, and hexahydric alcohol, and fatty acid esters comprised of monobasic fatty acid having 10 or more of carbon atoms and one of a monohydric alcohol through hexahydric alcohol where the fatty acid ester has a total carbon atom range of from 11 to 28. A fatty acid having from 8 to 22 carbon atoms, a fatty acid amide, or an aliphatic alcohol can be also used. Specific examples of such organic lubricating agents include butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, oleil alcohol, lauryl alcohol, and the like. An additive of lubricating agent can be used alone as a lubricating agent in the present invention, such as an antioxidant, (alkylphenol and the like), a rust-preventing agent (naphthenic acid, alkenyl succinic acid, dilauryl phosphate, and the like), oil (rape oil, lauryl alcohol, and the like), an extreme pressure additive (dibenzyl sulfide, tricresyl phosphate, tributyl phosphite, and the like), a detergent, a viscosity index improver, a pour point depressant, and a defoaming agent. These lubricating agents can be used in an amount of from 0.05 to 20 parts by weight per 100 parts by weight of the binder. These lubricating agents are disclosed in Japanese Patent Publication Nos. 23889/68, 24041/73, 18482/73 and 28043/72, U.S. Pat. Nos. 3,423,233, 3,470,021, 3,492,235, 3,497,411, 3,523,086, 3,625,760, 3,630,772, 3,634,253, 3,642,539, and 3,687,725, *IBM Technical Disclosure Bulletin,* Vol. 9(7), p. 779 (December, 1966); *ELEKTRONIK,* Vol. 12, p. 380 (1961); and *Kaqaku Binran* (applied edition), pp. 954–967, published by Maruzen Co., Ltd. (1980).

The antistatic agents used in the present invention include electroconductive particles such as graphite, carbon black, carbon black graft polymer, and the like; natural surface active agents such as saponin; nonionic surface active agents such as alkylene oxide type agents, glycerin type agents, glycidol type agents, polyhydric alcohol, polyhydric alcohol ester, an addition product of alkyl phenol with ethylene oxide, and the like; cationic surface active agents such as higher alkyl amines, cyclic amine, hydantoin derivatives, amide amine, ester amide, quaternary ammonium salts, pyridin and other heterocyclic compounds, phosphonium, or sulphonium; anionic surface active agents such as a compound having an acid group of a carboxylic acid, a sulfonic acid, a phosphoric acid, or a sulfate group or a phosphate group; and amphoteric surface active agents such as amino acid, amino sulphonic acids, a sulfate or phosphate of aminoalcohol, or an alkyl betaine type compound. Examples of these surface active agents that can be used as an antistatic agent are disclosed in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, and 3,545,974, West German Patent Application (OLS) No. 1,942,665, British Patents Nos. 1,077,317, and 1,198,450, *Method for Synthesizing and Applying Surface Active Agents,* by Ryohei Oda et al, published by Maki Shoten in 1972; A. W. Baily, *Surface Active Agents* (Interscience Publication Corporated, 1958); T. P. Sisley *Encyclopedia of Surface Active Agents,* Vol. 2 (Chemical Publishing Company, 1964), *Kaimen Kasseizai Binran,* 6th edition, (Sangyo Tosho Co., Ltd., Dec 20, 1966), and Hideo Marumo, *Antistatic Agents,* (Saiwai Shobo, 1968).

These surface active agents can be added alone or in mixture. These surface active agents can be used as an antistatic agent, and can be used for other purposes, for example, for improving dispersion and magnetic properties, improving lubricating properties, or as a coating aid.

Carbon black used in the present invention includes furnace black for rubber compositions, thermal black for rubber compositions, color carbon black, and carbon black for battery, such as Super Abrasion Furnace (SAF), Intermediate SAF (ISAF), Intermediate ISAF, High Abrasion F., Super Processing F., T. Type, Fine F., Fast Extruding F., High Modulus F., General Purpose F., All Purpose F., Semi Reinforcing F., Multi Purpose F., Extra Conductive F., Super CF., Conductive F., Fine Thermal, Medium Thermal, Acetylene Black, High Colour Channel, High Colour F., Medium Colour F., Long Flow F., and Regular Colour F.. Also, carbon blacks as classified according to ASTM standard D-1765-82a can be used. An average particle size of carbon black used in the present invention is from 10 to 1,000 m$\mu$ (by electron microscope), specific surface area measured by the nitrogen adsorption method is from 1 to 800 m$^2$/g, the pH is from 6 to 11 (JIS standard K-6221-1982 method), and the amount of DBP (dibutyl phthalate) oil absorption is from 10 to 400 ml/100 g (JIS standard K-6221-1982 method). Carbon black having a particle size of from 10 to 100 m$\mu$ can be used to reduce surface electric resistance of a coated layer, and carbon black having a particle size of from 50 to 1,000 m$\mu$ can be used for controlling strength of a coated layer. Fine carbon black having a particle size of 100 m$\mu$ or less can be used for controlling surface roughness of a coated layer, to reduce a spacing loss and to smooth the coated layer, and coarse carbon black having a particle size of 50 m$\mu$ or more can be used to coarsen the coated layer to reduce the friction coefficient. Thus, the kinds and amounts of carbon black to be used depends upon the particular purposes of a magnetic recording medium. The above-described carbon black can be surface-treated with dispersing agents referred to hereinabove and can be grafted with resins. Further, carbon black which is treated in a furnace at 2,000° C. or more upon preparing carbon black to partially produce graphite carbon black can be also used. As a special carbon black, hollow carbon black can be also used. These carbon blacks are preferably used in an amount of from 0.1 to 20 parts by weight per 100 parts by weight of ferromagnetic particles. Carbon blacks used in the present invention are further described in *Carbon Black Binran*, published by the Carbon Black Association, 1971.

Organic solvents used upon dispersing, kneading, and coating in the present invention include ketones such as acetone, methyl ethyl ketone, methyl isobutyl ketone, cyclohexanone, isophorone, or tetrahydrofuran; alcohols such as methanol, ethanol, propanol, butanol, isobutyl alcohol, isopropyl alcohol, or methylcyclohexanol; esters such as methyl acetate, ethyl acetate, butyl acetate, isobutyl acetate, isopropyl acetate, ethyl lactate, or ethylene glycol monoethyl ether acetate; glycol ethers such as ether, glycol dimethyl ether, glycol monoethyl ether, or dioxane; tars (aromatic hydrocarbons) such as benzene, toluene, xylene, cresol, chlorobenzene, or styrene; chlorinated hydrocarbons such as methylene chloride, ethylene chloride, carbon tetrachloride, chloroform, ethylene chlorohydrin, or dichlorobenzene, N,N-dimethyl formaldehyde, and hexane.

Methods for mixing and kneading are not particularly limited, and orders of adding each component are optionally determined. To prepare the coating composition, generally used mixing and kneading devices are used, such as two-roll mill, a three-roll mill, a ball mill, pebble mill, trommel, a sand grinder, Szegrari Attritor, a high speed impellor dispersing device, a high speed stone mill, a high speed impact mill, a disper, a kneader, a high speed mixer, a ribbon blender, a co-kneader, an intensive mixer, a tumbler, a blender, a disperser, a homogenizer, a single axis screw extruding device, a biaxial screw extruding device, or an ultrasonic dispersing device and the like. The technique for mixing, kneading, and dispersing is disclosed in detail in T. C. Patton, *Paint Flow and Pigment Dispersion* (1964, John Wiley & Sons) and Shinichi Tanaka, *Industrial Material*, Vol. 25, p. 37 (1977), as well as in U.S. Pat. Nos. 2,581,414 and 2,855,156. Magnetic coating composition of the present invention can be prepared by mixing, kneading, and dispersing in the similar manner as disclosed in the above disclosure.

A magnetic layer can be prepared by selecting the above compositions adequately, dissolving the compositions in an organic solvent, coating the resulting coating composition on a support, and drying it. When a magnetic recording medium is a tape, a thickness of a support is preferably about from 2.5 to 100 $\mu$m and more preferably from 3 to 70 $\mu$m. When a magnetic recording medium is a disk or a card, the thickness of a support is about from 0.5 to 10 mm and in case of a drum, a support can be cylindrical. Materials for a support include polyesters such as polyethylene terephthalate or polyethylene naphthalate; polyolefins such as polypropylene; cellulose derivatives such as cellulose triacetate or cellulose diacetate; vinyl type resins such as polyvinyl chloride; plastics such as polycarbonate, polyamide, or polysulfone; metals such as aluminum or copper; and ceramics such as glass. Prior to coating, these supports may be subjected to corona discharge treatment, plasma treatment, sub-coating treatment, heat treatment, dust and contaminant removing treatment, metal vapor deposition treatment, and alkali treatment. Descriptions regarding these supports are disclosed, for example, in West German Patent No. 3,338,854A, Japanese Patent Application (OPI) No. 116926/84 (the term "OPI" as used herein means an "unexamined published application"), U.S. Pat. 4,388,368 and Yukio Miishi, Fiber and Industry, Vol. 31, pp. 50 to 55, 1975.

The method for coating the above-described magnetic recording layer on a support includes an air doctor coating method, a blade coating method, an air knife coating method, a squeeze coating method, a dip coating method, a reverse roll coating method, a transfer roll coating method, a gravure coating method, a kiss coating method, a cast coating method, a spray coating method, and like methods. Such coating methods are described in more detail in *Coating Kogaku* (Coating Engineering), pp. 253 to 277, published by Asakura Shoten, Japan, on Mar. 20, 1971.

The magnetic layer thus coated on a support is, if desired, subjected to orientation to orientate magnetic particles contained therein, and then is dried. The speed of carrying the support is generally from 10 m/min. to 500 m/min. The drying temperature is adjusted to from 20° C. to 120° C.

The magnetic layer is subjected to a surface smoothing treatment or is cut to a desired shape, if necessary, to produce a magnetic recording medium of the present invention in accordance with the method as disclosed, for example, in Japanese Patent Publication Nos. 23625/65, 28368/64 and 13181/66 and U.S. Pat. No. 3,473,960.

The backing layer is provided on the back surface of the support opposite to the magnetic layer for the purpose of preventing static charging, print through and wow flutter, and improving the strength of magnetic recording medium and running properties of the back surface.

In order to prepare a coating solution for a backing layer, at least one of additives such as a lubricating agent, an abrasive agent, or an antistatic agent, and a dispersing agent, if necessary for dispersing the additive homogeneously, a binder and a solvent used for coating are mixed, kneaded, and dispersed. Then, the resulting coating solution is coated on the back surface of the support to prepare a backing layer and is dried. Any one of a backing layer or a magnetic layer can be provided on a support precedingly.

Commonly and preferably used additives include carbon black, graphite, talc, $Cr_2O_3$, $\alpha$-$Fe_2O_3$ (red iron oxide), $CaCO_3$, ZnS, $MgCO_3$, ZnO, $TiO_2$, $Fe_3O_4$, $SnO_2$, SiC and silicone oil. It is particularly preferred that fine carbon black and coarse carbon black are added in combination as described in U.S. Pat. No. 4,582,757 and Japanese Patent Application (OPI) Nos. 223937/84 and 107729/85.

Binders which can be used in the backing layer include those known in this art, e.g., thermoplastic resins, thermosetting resins, reactive resins and mixtures thereof as described in U.S. Pat. Nos. 4,367,261 and 4,414,270. Specifically, the binder can be selected from resins as set forth below, and it is to be desired that such resins should have a glass transition temperature Tg not lower than 40° C., more preferably not lower than 60° C., in an independent state or in a mixture of two or more thereof.

Specific examples of thermoplastic resins which can be employed include vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinylidene chloride copolymers, acrylic acid ester-styrene copolymers, methacrylic acid ester-acrylonitrile copolymers, methacrylic acid ester-acrylonitrile copolymers, methacrylic acid ester-vinylidene chloride copolymers, methacrylic acid ester-styrene copolymers, urethane elastomers, polyvinyl fluoride, vinylidene chloride-acrylonitrile copolymers, butadiene-acrylonitrile copolymers, polyamide resins, polyvinyl butyral, cellulose resins (such as cellulosed acetate butyrate, cellulose diacetate, cellulose propionate, nitrocellulose, etc.), styrene-butadiene copolymers, polyester resins, chlorovinyl ether-acrylic acid ester copolymers, amino resins, various resins of rubber type and so on. Of these, vinyl chloride-vinyl acetate copolymers, urethane elastomers, cellulose resins, vinyl chloride-vinyliden chloride resins, polyester resins, styrene-butadiene and copolymers are preferred. Most preferred examples include urethane elastomers, cellulose resins and polyester resins.

Specific examples of thermosetting resins or reactive resins which can be employed include phenol resins, epoxy resins, curable type polyurethane resins, urea resins, melamine resins, alkyd resins, acryl type reactive resins, polyisocyanates, polyamines and so on. Of these, phenol resins, epoxy resins and polyisocyanates are preferred, with polyisocyanates being most preferred.

The backing layer of the present invention preferably has a thickness of 2 $\mu$m or less, and more preferably from 0.5 to 1.5 $\mu$m.

The magnetic recording medium may further comprise an underlayer, and an underlayer for the backing layer. The magnetic recording medium of the present invention can be prepared using the materials and the preparation method described in U.S. Pat. No. 4,135,016.

The present invention is further illustrated in more detail by the following Examples. It will be understood by those skilled in this art that materials, quantities, and operation orders can be changed so long as the gist of the present invention is not essentially changed. Accordingly, the present invention is not limited to the following Examples. In the Examples, all parts are by weight.

EXAMPLE 1

The following composition was introduced into a co-kneader, mixed, and kneaded sufficiently, then was dispersed in a ball mill. Thereafter 15 parts of a polyisocyanate compound ("Desmodur L-75", trademark for product manufactured by Bayer Co., Ltd.) was added thereto and they were mixed, and dispesed homogeneously to obtain a magnetic coating composition.

| | |
|---|---|
| Co-containing $\gamma$-$Fe_2O_3$ particles (Co content: 5 wt % with respect to iron oxide content; $Fe^{2+}$ content: 4 wt % per $Fe^{3+}$; Specific surface area measured by nitrogen absorption method: 35 $m^2$/g, Hc of particles: 780 Oe) | 300 parts |
| Vinyl chloride-vinyl acetate-maleic acid copolymer ("VMCH", trademark for product manufactured by Union Carbide Co.) | 30 parts |
| Polyurethane ("Nippollan N2304", trademark for product manufactured by Nippon Polyurethane Co., Ltd.) | 15 parts |
| Abrasive agent ($Cr_2O_3$; average particle size: 0.5 $\mu$m; Mohs hardness: 9) | 15 parts |
| Carbon black (Average particle size: 20 m$\mu$) | 6 parts |
| Lecithin | 3 parts |
| Oleic acid | 3 parts |
| Octyl laurate | 3 parts |
| Lauric acid | 3 parts |
| Butyl acetate | 400 parts |
| Methyl ethyl ketone | 200 parts |

The above coating composition was coated on a polyethylene terephthalate support after the viscosity of the composition was adjusted, and was subjected to orientation and dried to produce a sample.

The following composition for a backing layer was mixed and kneaded in a ball mill and thereafter 6 parts of a polyisocyanate compound ("Collonate 2061", trademark of product, manufactured by Nippon Polyurethane Co., Ltd.) was added thereto, and they were mixed and dispersed homogeneously and were coated on the opposite surface of the polyester support to the magnetic layer in a thickness of 1.5 $\mu$m and dried.

| | |
|---|---|
| Carbon black ("Raven MTP", trademark; average particle size: 250 m$\mu$ | 100 parts |
| Carbon black (average particle size: 20 m$\mu$) | 30 parts |
| Polyurethane ("Nippollan N2304", trademark for product manufactured by Nippon Polyurethane Co., Ltd.) | 35 parts |
| Phenoxy resin ("PKHH", trademark for product manufactured by | 16 parts |

| | | | | -continued | | | |
|---|---|---|---|---|---|---|---|
| Union Carbide Co., Ltd.) | | | | | | | |
| Copper oleate | | | | 0.5 part | | | |
| Methyl ethyl ketone | | | | 800 parts | | | |
| Cyclohexanone | | | | 200 parts | | | |

The resulting tape was subjected to mirror treatment and was slit to prepare Sample No. 1.

COMPARATIVE EXAMPLE 1

The same procedure as in Example 1 was repeated except that the abrasive agent in the coating composition was removed, and Sample No. 2 was thus obtained.

COMPARATIVE EXAMPLE 2

The same procedure as in Example 1 was repeated to prepare a coating composition except that 15 parts of copolymer of vinyl chloride-vinyl acetate-maleic acid were used and that 30 parts of "Nippolan N2304" were used, and the same procedure as in Example 1 was repeated, to thus obtain Sample No. 3.

COMPARATIVE EXAMPLE 3

The same procedure as in Example 1 was repeated to prepare a coating composition except that Co content was 5 wt % with respect to the iron oxide content and that the $Fe^{2+}$ content was 11 wt % with respect to the $Fe^{3+}$ content, to thus obtain Sample No. 4.

COMPARATIVE EXAMPLE 4

The same procedure as in Example 1 was repeated except that the same magnetic particles as in Comparative Example 3 were used and that the abrasive agent was removed, to thus prepare Sample No. 5.

COMPARATIVE EXAMPLE 5

The same procedure as in Example 1 was repeated except that 130 parts of carbon black "Raven MTP" were used in the composition for the backing layer, to thus prepare Sample No. 6.

COMPARATIVE EXAMPLE 6

The same procedure as in Example 1 was repeated except that a backing layer was not provided, to thus prepare Sample No. 7.

COMPARATIVE EXAMPLE 7

The same procedure as in Example 1 was repeated except that magnetic particles having a specific surface area of 35 m²/g were used, the Co content was 3.5 wt % with respect to the iron oxide content, and the $Fe^{2+}$ content was 4 wt % with respect to the $Fe^{3+}$ content, to thus prepare Sample No. 8.

COMPARATIVE EXAMPLE 8

The same procedure as in Example 1 was repeated except that magnetic particles having a specific surface area of 28 m²/g were used, the Co content was 7.0 wt % with respect to the iron oxide contents, and the $Fe^{2+}$ content was 4 wt % with respect to the $Fe^{3+}$ content, to thus prepare Sample No. 9.

COMPARATIVE EXAMPLE 9

The same procedure as in Example 1 was repeated except that magnetic particles having a specific surface area of 23 m²/g were used, the Co content was 11 wt % with respect to the iron oxide content, and the $Fe^{2+}$ content was 4 wt % with respect to the $Fe^{3+}$ content, to thus prepare Sample No. 10.

EXAMPLE 2

The same procedure as in Example 1 was repeated except that an epoxy resin (epoxy value=0.56) was used instead of "Nippollan N2304", the mixing ratio of vinyl chloride-vinyl acetate-maleic acid copolymer/epoxy resin was 35/10, and $Al_2O_3$ (average particle size: 0.2 μm; Mohs hardness: 9) was used instead of $Cr_2O_3$, to thus prepare Sample No. 11.

Characteristics of these samples were measured as described below, and the results thereof are shown in Tables 1 and 2.

C/N:

C/N was measured at 8 MHz of carrier signals.

C/N with time passage:

Carrier signals at 8 MHz were recorded on a tape, which as then stored at 50° C. for three days. Then the signals were recorded on the recorded tape again and C/N was measured.

Decrease of output:

Video signals were recorded at optimum recording electric current. Comparison was made among samples when envelope of reproduced RF output of Sample 1 was made a standard one.

(Number of dropout)

The number of dropout was measured after tapes were repeatedly used for 250 passes. The dropout value is defined in terms of occurrences of dropouts for $15 \times 10^{-6}$ sec or more per minute, and is measured by a dropout counter where the reproduced output level was decreased by 16 dB or more.

The surface roughness was measured by a needle contact surface roughness meter ("Surfcom 8000A type", trademark for product manufactured by Tokyo Seimitsu K.K.). The cutoff value was 0.8 mm.

TABLE 1

| | Magnetic Layer | | | | | | | Center Line Average Roughness of Backing Layer (μm) | Coercive Force of Magnetic Tape (Oe) |
|---|---|---|---|---|---|---|---|---|---|
| | Ferromagnetic Particles | | | Binder | | | Abrasive | | |
| Sample No. | Cobalt Content (wt %) | $Fe^2$ Content (wt %) | Specific Surface Area (m²/g) | VC/VA/MA Copolymer (part) | PU (part) | PI (part) | Agent $Cr_2O_3$ (part) | | |
| 1 (invention) | 5 | 4 | 35 | 30 | 15 | 15 | 15 | 0.010 | 810 |
| 2 | 5 | 4 | 35 | 30 | 15 | 15 | — | 0.010 | 800 |
| 3 | 5 | 4 | 35 | 15 | 30 | 15 | 15 | 0.010 | 805 |
| 4 | 5 | 11 | 35 | 30 | 15 | 15 | 15 | 0.010 | 810 |
| 5 | 5 | 11 | 35 | 30 | 15 | 15 | — | 0.010 | 805 |
| 6 | 5 | 4 | 35 | 30 | 15 | 15 | 15 | 0.018 base | 810 |
| 7 | 5 | 4 | 35 | 30 | 15 | 15 | 15 | 0.008 | 810 |
| 8 | 3.5 | 4 | 35 | 30 | 15 | 15 | 15 | 0.010 | 700 |

TABLE 1-continued

| Sample No. | Magnetic Layer | | | | | | | Center Line Average Roughness of Backing Layer (μm) | Coercive Force of Magnetic Tape (Oe) |
|---|---|---|---|---|---|---|---|---|---|
| | Ferromagnetic Particles | | | Binder | | | Abrasive | | |
| | Cobalt Content (wt %) | $Fe^2$ Content (wt %) | Specific Surface Area (m$^2$/g) | VC/VA/MA Copolymer (part) | PU (part) | PI (part) | Agent $Cr_2O_3$ (part) | | |
| 9 | 7 | 4 | 28 | 30 | 15 | 15 | 15 | 0.010 | 800 |
| 10 | 11 | 4 | 23 | 30 | 15 | 15 | 15 | 0.010 | 800 |
| | | | | | epoxy | | $Al_2O_3$ | | |
| 11 (invention) | 5 | 4 | 35 | 35 | 10 | 15 | 15 | 0.010 | 810 |

Note
VC: vinyl chloride
MA: maleic acid
PI: polyisocyanate
VA: vinyl acetate
PU: polyurethane

TABLE 2

| Sample No. | C/N (dB) | Output Decrease (dB) | C/N with Time Passage (dB) | Number of Dropouts |
|---|---|---|---|---|
| 1 (invention) | 0 | 0 | 0 | 6 |
| 2 | 0 | −2.0 | 0 | >100 |
| 3 | 0 | −2.2 | 0 | >100 |
| 4 | 0 | 0 | −2.3 | 6 |
| 5 | 0 | −0.1 | −2.1 | 6 |
| 6 | −2.0 | +0.1 | 0 | 5 |
| 7 | +0.2 | 0 | −0.7 | >100 |
| 8 | <−5.0 | — | — | 64 |
| 9 | −2.0 | −1.8 | −1.4 | 8 |
| 10 | −2.7 | −1.5 | −1.5 | 13 |
| 11 (invention) | 0 | 0 | 0 | 8 |

It is clear from the results shown in Table 2 that C/N, decrease of output, C/N with passage of time and the number of dropouts can remarkably be improved by using magnetic particles having a prescribed cobalt content, $Fe^{2+}$ content and a specific surface area, using a prescribed binder and an abrasive agent, providing a prescribed backing layer and adjusting the coercive force of the resulting magnetic tape to a prescribed range.

While the invention has been described in detail and with reference to specific embodiments thereof, it will be apparent to one skilled in the art that various changes and modifications can be made therein without departing from the spirit and scope thereof.

What is claimed is:

1. A magnetic digital recording medium comprising a magnetic layer containing ferromagnetic fine particles and a binder coated on one side of a non-magnetic support and a backing layer coated on the opposite side of the non-magnetic support, wherein said ferromagnetic fine particles have a cobalt content of from 2 to 10 wt % with respect to the iron oxide content thereof, the content of divalent iron ($Fe^{2+}$) of from 1 to 10 wt % with respect to the trivalent iron ($Fe^{3+}$) content thereof, and the specific surface area of from 30 to 50 m$^2$/g, said binder comprises a copolymer of vinyl chloride-vinyl acetate-maleic acid contained in an amount of 40 wt % or more with respect to the total binder content of the magnetic layer, an abrasive agent having a Mohs hardness of 6 or more is contained in said magnetic layer, and the resulting magnetic tape has a coercive force of from 750 to 900 Oe at 25° C.

2. A magnetic digital recording medium as in claim 1, wherein the center line average roughness (Ra) of the backing layer is 0.014 μm or less at a cutoff value of 0.8 mm.

3. A magnetic digital recording medium as in claim 1, wherein the content of divalent iron ($Fe^{2+}$) is from 1 to 8 wt % with respect to the trivalent iron ($Fe^{3+}$) content, and the Co content is from 3 to 8 wt % with respect to the iron oxide content.

4. A magnetic digital recording medium as in claim 1, wherein the content of divalent iron ($Fe^{2+}$) is from 1 to 5 wt % with respect to the trivalent iron ($Fe^{3+}$) content, and the Co content is from 4 to 6 wt % with respect to the iron oxide content.

5. A magnetic digital recording medium as in claim 1, wherein the total binder content is from 5 to 300 parts by weight per 100 parts by weight of ferromagnetic fine particles.

6. A magnetic digital recording medium as in claim 1, wherein the abrasive agent has an average particle size of from 0.01 to 5 μm, and is used in an amount of from 0.01 to 20 parts by weight per 100 parts by weight of total binder content.

* * * * *